US009042632B2

(12) United States Patent
Petker et al.

(10) Patent No.: US 9,042,632 B2
(45) Date of Patent: May 26, 2015

(54) METHOD AND SYSTEM FOR TOUCHLESS COUNTING OF STACKED SUBSTRATES, ESPECIALLY BUNDLED BANKNOTES

(75) Inventors: Denis Petker, Detmold (DE); Volker Lohweg, Bielefeld (DE); Eugen Gillich, Bielefeld (DE); Thomas Türke, Lonay (CH); Harald Heinrich Willeke, Paderborn (DE); Johannes Georg Schaede, Würzburg (DE)

(73) Assignee: KBA-NOTASYS SA, Lausanne (CH)

( * ) Notice: Subject to any disclaimer, the term of this patent is extended or adjusted under 35 U.S.C. 154(b) by 280 days.

(21) Appl. No.: 13/806,957

(22) PCT Filed: Jun. 23, 2011

(86) PCT No.: PCT/IB2011/052758
§ 371 (c)(1),
(2), (4) Date: Aug. 12, 2013

(87) PCT Pub. No.: WO2011/161642
PCT Pub. Date: Dec. 29, 2011

(65) Prior Publication Data

US 2014/0147029 A1 May 29, 2014

(30) Foreign Application Priority Data

Jun. 25, 2010 (EP) .................................... 10167383

(51) Int. Cl.
*G07D 11/00* (2006.01)
*G06M 9/00* (2006.01)
*G06T 7/00* (2006.01)

(52) U.S. Cl.
CPC ............. *G07D 11/0084* (2013.01); *G06M 9/00* (2013.01); *G06T 7/0085* (2013.01)

(58) Field of Classification Search
USPC ......... 382/100, 135, 136, 137, 138, 181, 192, 382/194, 199; 194/4; 209/534; 235/379; 356/71; 902/7; 377/3, 13; 348/135, 143
See application file for complete search history.

(56) References Cited

U.S. PATENT DOCUMENTS 5,405,251 A * 4/1995 Sipin ............................ 417/420
5,534,690 A * 7/1996 Goldenberg et al. ...... 250/222.1

(Continued)

FOREIGN PATENT DOCUMENTS

CA 2 173 675 10/1996
EP 0 737 936 A1 10/1996

(Continued)

OTHER PUBLICATIONS

Perona, P., et al, *IEEE Transactions on Pattern Analysis and Machine Intelligence*, vol. 12, No. 7, Jul. 1990, pp. 629-639, "Scale-Space and Edge Detection Using Anisotropic Diffusion."

(Continued)

*Primary Examiner* — Anand Bhatnagar
(74) *Attorney, Agent, or Firm* — Nixon & Vanderhye, PC

(57) ABSTRACT

There is described a method for touchless counting of substantially planar substrates, especially banknotes, which are stacked in the form of stacks of substrates, said method comprising the following steps: taking at least one sample image of a portion of a side of a stack of substrates, which sample image contains contrast information representing substrate edges that extend along substantially a first direction in the sample image; processing the contrast information representing the substrate edges within the sample image (10), which processing includes subjecting at least one area of interest (20) within the sample image (10) to anisotropic diffusion to produce a processed image containing a substantially coherent set of continuous lines representing the substrate edges; and counting the number of substrate edges in said processed image.

16 Claims, 4 Drawing Sheets

(56) References Cited

U.S. PATENT DOCUMENTS

| | | | | |
|---|---|---|---|---|
| 6,701,025 | B1 * | 3/2004 | Avinash | 382/261 |
| 7,347,369 | B2 * | 3/2008 | Dauw et al. | 235/435 |
| 7,382,910 | B2 | 6/2008 | Donders | |
| 7,747,045 | B2 * | 6/2010 | Chinen et al. | 382/118 |
| 8,006,970 | B2 | 8/2011 | Sauer | |
| 8,064,714 | B2 * | 11/2011 | Albiez | 382/266 |
| 8,103,083 | B2 | 1/2012 | Schaede et al. | |
| 2006/0067559 | A1 * | 3/2006 | Donders | 382/100 |
| 2006/0261148 | A1 * | 11/2006 | Dauw et al. | 235/379 |
| 2008/0105599 | A1 | 5/2008 | Schaede et al. | |
| 2009/0243181 | A1 | 10/2009 | Sauer | |
| 2011/0038701 | A1 | 2/2011 | Sauer | |
| 2011/0228971 | A1 * | 9/2011 | Webb et al. | 382/100 |
| 2012/0266729 | A1 | 10/2012 | Gygi et al. | |

FOREIGN PATENT DOCUMENTS

| | | | |
|---|---|---|---|
| EP | 2 282 286 | A1 | 2/2011 |
| WO | WO 96/22553 | A1 | 7/1996 |
| WO | WO 2004/059585 | A1 | 7/2004 |
| WO | WO 2004/097732 | A1 | 11/2004 |
| WO | WO 2006/016234 | A1 | 2/2006 |
| WO | WO 2008/010125 | A2 | 1/2008 |
| WO | WO 2009/130638 | A1 | 10/2009 |
| WO | WO 2011/015982 | A1 | 2/2011 |

OTHER PUBLICATIONS

Marr, D., et al, *Proceedings of the Royal Society of London*, B 207, 1980, pp. 187-217, “Theory of Edge Detection.”

* cited by examiner

METHOD AND SYSTEM FOR TOUCHLESS COUNTING OF STACKED SUBSTRATES, ESPECIALLY BUNDLED BANKNOTES

This application is the U.S. national phase of International Application No. PCT/IB2011/052758, filed 23 Jun. 2011, which designated the U.S. and claims priority to EP Application No. 10167383.8, filed 25 Jun. 2010, the entire contents of each of which are hereby incorporated by reference.

TECHNICAL FIELD

The present invention generally relates to a method and system for touchless counting of stacked substrates, especially bundled banknotes.

BACKGROUND OF THE INVENTION

Methods and systems for mechanically counting stacked substrates using e.g. so-called rotating counting discs (or like mechanical systems) are already known in the art, for instance from European patent application No. EP 0 737 936 A1 in the name of the present Applicant.

So-called "touchless" counting methods and systems have also been developed in an attempt to avoid the use of mechanical counting devices such as the above rotating counting discs. Such methods and systems are already known in the art, for instance from International applications Nos. WO 2004/097732 A1 and WO 2006/016234 A1, both in the name of the instant Applicant. Other methods and systems are further known from International applications Nos. WO 96/22553 A1 and WO 2004/059585 A1.

It has become apparent that the above touchless counting methods and systems are not sufficiently accurate and robust, and that there remains a need for an improved touchless counting methodology and suitable system for implementing the same.

SUMMARY OF THE INVENTION

A general aim of the invention is to provide an improved method and system for efficiently and accurately counting stacked substrates, especially bundled banknotes, using a touchless approach.

These aims are achieved thanks to the method and system defined in the claims.

BRIEF DESCRIPTION OF THE DRAWINGS

Features and advantages of the present invention will appear more clearly from reading the following detailed description of embodiments of the invention which are presented solely by way of non-restrictive examples and are illustrated by the attached drawings in which.

DETAILED DESCRIPTION OF EMBODIMENTS OF THE INVENTION

Machines and systems for processing sheets or successive portions of a web into individual banknotes and/or banknote bundles (such as disclosed for instance in International applications Nos. WO 2008/010125 A2 and WO 2009/130638 A1) and single-note processing systems for processing individual banknotes are widely used in the context of the production and/or processing of banknotes. Besides the typical cutting, bundling and/or sorting features of such systems which are today a mature technology, image-processing-based quality inspection for this type of machines and systems has become increasingly attractive. As more and more print techniques and new security features are established, quality measures must be taken throughout the banknote production and processing chain in order to ensure and guarantee overall quality of the end-product. This includes measures aimed at ensuring that the proper and desired numbers of individual documents, e.g. banknotes, are produced at the output of the production chain, which measures typically involve counting of stacks of documents.

Mechanical rotating counting discs of the type mentioned in the preamble hereof are known in the art but need a certain time to fully process a given stack of documents. For instance, a stack of one thousand banknotes typically requires approximately ten seconds to be fully processed by a mechanical counting disc. In that context, a pack of one thousand stacked banknotes is typically formed of ten bundles of hundred banknotes each which are piled one on top of the other. In the context of such an application, a false counting rate must be minimized and should preferably be smaller than 1 ppm.

Mechanical rotating counting discs (and like mechanical counting systems) are also prone to counting errors, which errors are mostly due to an insufficient and unsuccessful separation of the various banknotes within the stack, e.g. two banknotes being processed as a single one, thereby leading to a missing count.

Figure 1:
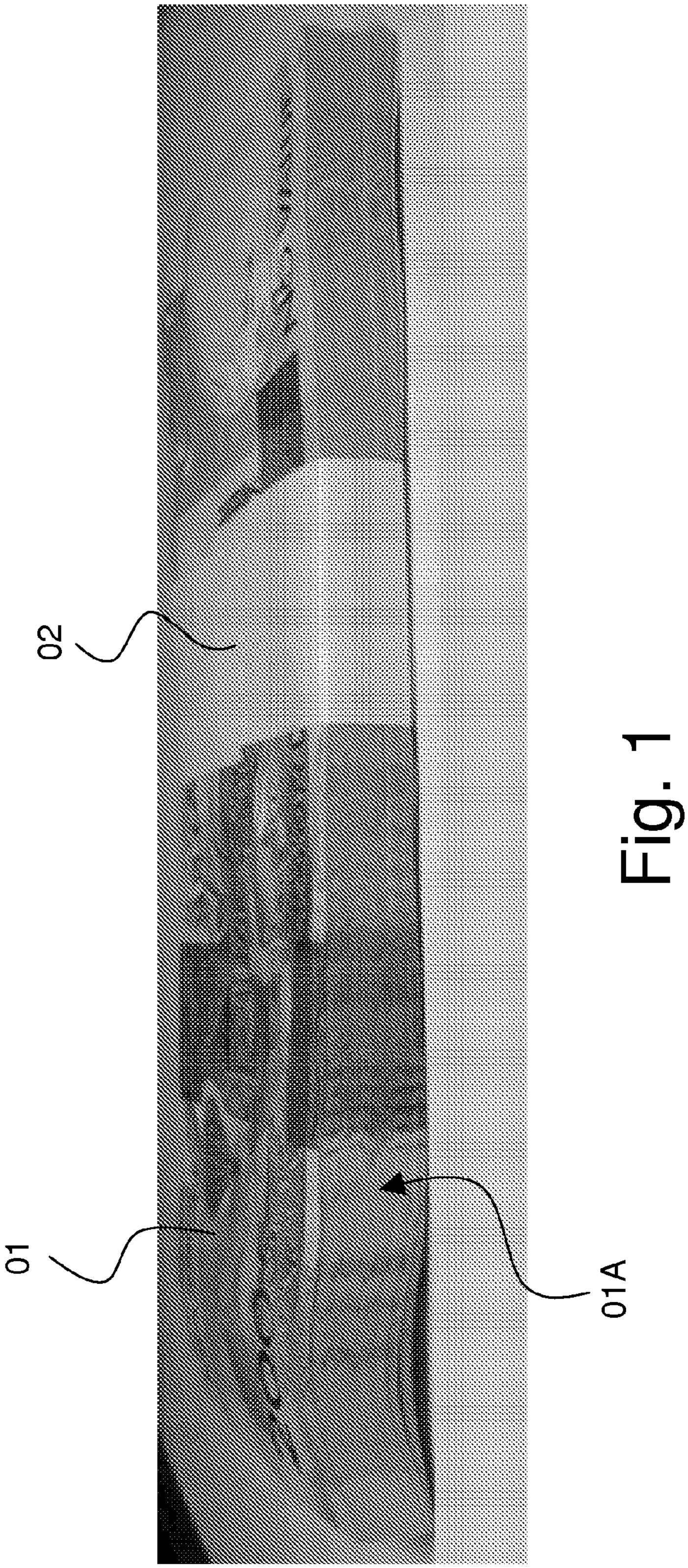
FIG. 1 is a greyscale photographic illustration of a banknote bundle comprising a plurality of (typically hundred) banknotes stacked one above the other.

The approach according to the present invention takes advantage from the fact that each banknote in a bundle (or more generally each planar substrate within a stack) may be separated visually. FIG. 1 which is a photographic illustration of a banknote bundle 01 comprising hundred banknotes (which are surrounded by a securing band 02 in this example) illustrates the fact that contrast differences between the stacked banknotes can be detected in most cases by the human eye by looking at a side 01A of the banknote bundle. Unfortunately, such contrast differences may be affected by the fact that two adjacent banknotes may touch each other or by other factors such as banknotes casting shadows or hiding adjacent banknotes or the presence of paper fibers on the cut edge of the banknotes which may be the result of improper cutting or a defective cutting blade. As this is apparent on FIG. 1, features printed on the banknotes (or other features such as security threads) may also affect the visual appearance of the side 01A of the banknote bundle 01.

The present methodology is particularly aimed at enabling a robust touchless counting operation in the presence of fibers and other contrast-destroying effects such as security threads, printing inks and the like.

Figure 4:
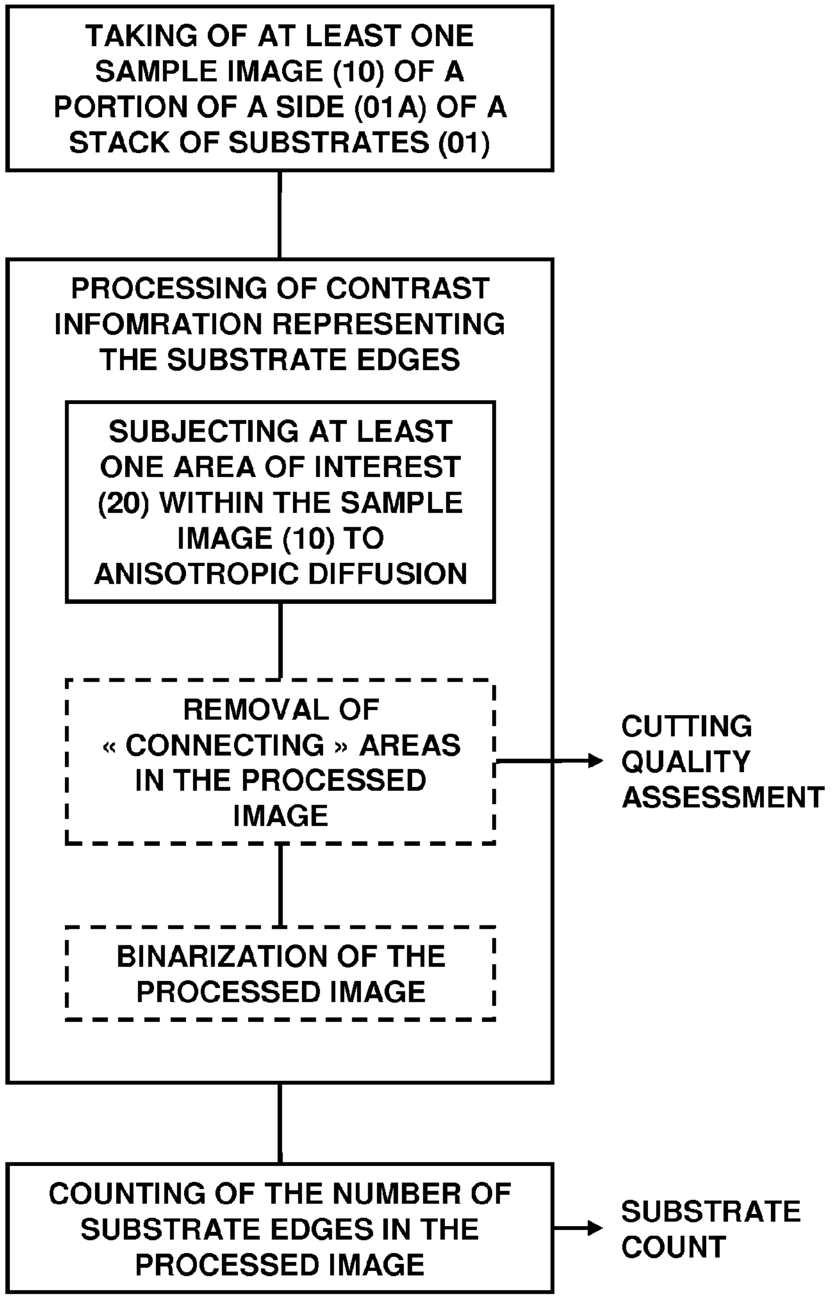
FIG. 4 is a flow chart illustrating a preferred embodiment of the present invention.

Generally speaking, processing of the banknotes according to the invention is carried out as follows, which processing is illustrated in the flow chart of FIG. 4.

Figure 2:
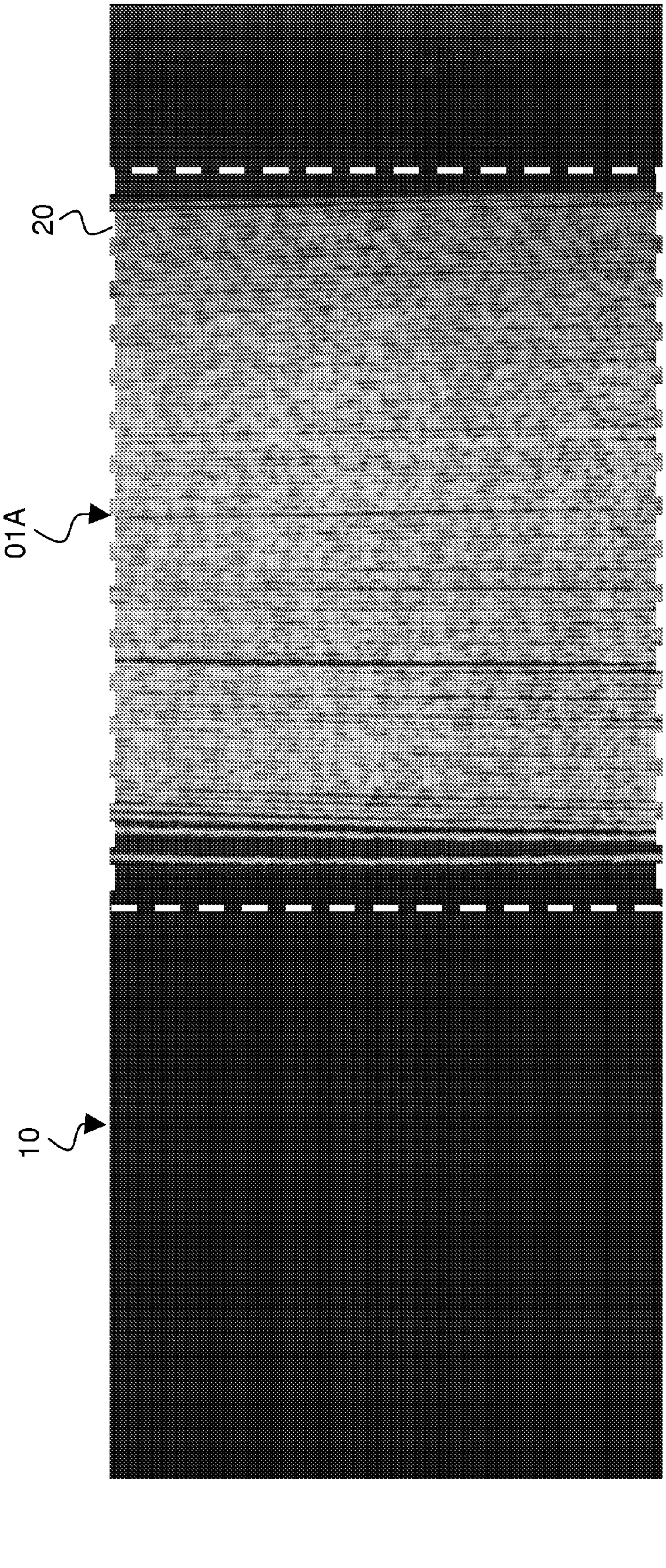
FIG. 2 is an exemplary illustration of a sample image of a portion of the side of a stack of banknotes.

In a first step, at least one sample image 10 of a portion of the side 01A of the stack of banknotes 01 is acquired (see FIG. 2) by means of a suitable optical sensor system, preferably a CMOS array or line-scan camera. Even though FIG. 2 shows a greyscale illustration of an illustrative sample image 10, the sample image may be acquired (and processed) in any suitable color space.

A suitable illumination system, such as an LED illumination, is preferably used to properly illuminate the side 01A of the stack of banknotes 01 that one wishes to take a sample image of, especially with a view to minimize issues like shadows that may be caused by banknotes and that could hide or affect the visibility of the edges of adjacent banknotes in the stack.

A preferred way of acquiring the sample image in the context of a typical sheet processing system for the production of securities, such as banknotes, is disclosed in European patent application No. 09167085.1 in the name of the Applicant (now published as EP 2 282 286 A1) filed on Aug. 3, 2009 and corresponding International application No. PCT/IB2010/053496 (published as WO 2011/015982 A1) entitled "METHOD AND SYSTEM FOR PROCESSING STACKS OF SHEETS INTO BUNDLES OF SECURITIES, IN PARTICULAR BANKNOTE BUNDLES", the content of which is incorporated herein by reference in its entirety.

According to EP 2 282 286 A1 and WO 2011/015982 A1, at least one sample image of at least a portion of a longitudinal side of a bundle strip (i.e. strips of bundles still connected to one another which are typically produced during cutting of stacks of sheets of securities) is taken while the bundle strip is being displaced along a direction of displacement which is parallel to the longitudinal side of the bundle strip. Preferably, a plurality of sample images of various portions of the longitudinal side of the bundle strip are taken as schematically illustrated in FIG. 8 of EP 2 282 286 A1 and WO 2011/015982 A1.

Alternatively, samples images may be taken at a time directly following a cutting operation as discussed in WO 2006/016234 A1.

A desired window, or area of interest, 20 within the sample image 10 is then selected (e.g. an 800×600 pixel window—see rectangle portion in FIG. 2 which is designated by reference numeral 20—which image size is however illustrative and by no means limiting). This area of interest 20 is selected to focus on the region within the sample image 10 which contains contrast information representative of the succession of stacked banknotes and the edges thereof.

The image data of the selected area of interest 20 is then processed using an anisotropic diffusion technique. This image-processing technique is known per se in the art, typically for image restoration applications, and is preferably based on the Perona-Malik equation, also sometimes called "Perona-Malik diffusion" (cf. "*Scale-Space and Edge Detection Using Anisotropic Diffusion*", Pietro Perona and Jitendra Malik, IEEE Transactions on Pattern Analysis and Machine Intelligence, Vol. 12, No. 7, July 1990, pp. 629 to 639—hereinafter referred to as [Perona1990]). An advantage of the anisotropic diffusion technique resides in the fact that linear structures contained in the image being processed are preserved, while at the same time smoothing is made along these linear structures to effectively remove noise along these linear structures.

The inventors have identified that anisotropic diffusion is very well suited to the application to which the present invention relates, namely processing of sample images containing contrast information representative of the substrate edges, which contrast information consists in essence of linear structures (see FIG. 2) that will be preserved in the processed image. Anisotropic diffusion therefore ensures that the necessary information about the substrate edges is being preserved while improving the image content for the purpose of reliably discriminating and counting the substrate edges present in the processed image.

Advantageously, the anisotropic diffusion technique is applied in the frequency domain using a wavelet-based approach to remove noise from the selected area of interest without destroying or blurring contrast edges in the selected area of interest. In this context, implementation of the locally adapted filters of the anisotropic diffusion is based on a so-called adaptive wavelet transform. Indeed, as mentioned in [Perona1990], anisotropic diffusion is a processing technique that follows a multiscale approach (or scale-space technique) which can conveniently and efficiently be implemented using so-called wavelet transforms (or simply "wavelets").

The Perona-Malik equation is in essence an example of so-called Partial Differential Equations (or "PDEs"). As PDEs are equations based on multivariable calculus the corresponding transform (with constraints) can be—in general—a wavelet transform, because it describes the behaviour of a system or signal in the state-space domain. Edges are the most common and significant visual features in images. Therefore, it is one of the fundamental problems in image processing to properly define and extract edges from images (see in that respect "*Theory of Edge Detection*", David Marr and Ellen Hildreth, Proceedings of the Royal Society of London, B 207, 1980 pp. 187 to 217—hereinafter referred to as [Marr1980]). [Marr1980] defines the zero-crossing theory based on Laplacian-of-Gaussian Filters which are nothing else but Wavelets (see also "*Image Processing and Analysis: Variational, PDE, Wavelet, and Stochastic Methods*", Tony F. Chan and Jianhong (Jackie) Shen, Society for Industrial and Applied Mathematics (SIAM), Philadelphia, Pa., 2005, pp. 73 to 89, Section 2.6 "*Wavelets and Multiresolution Analysis*"/ISBN 0-89871-589-X).

Considering that the banknote edges in the area of interest have a substantially defined orientation (namely vertically in FIG. 2), the anisotropic diffusion technique is adapted to efficiently filter the banknotes along the paper direction without destroying the contrast edges between the banknotes. As a result of this adapted anisotropic diffusion, a substantially coherent set of continuous lines representing the banknote edges (which lines extend substantially vertically in the present example) is formed in the processed image.

Counting of the banknote edges may be carried out on the basis of the thus-processed image. However, adjacent lines in the processed image may "connect" or "touch" each other forming "Y"-type of "X"-type connections between adjacent lines, which could lead to counting errors. Preferably, these "connecting", or "touching", areas are removed by (i) tracking each individual line in the processed image (along the vertical direction in this example), (ii) detecting the relevant portions of the image where two adjacent lines (or more) meet, and (iii) separating the relevant portions of the lines from one another.

Advantageously, the number of "connecting" areas detected in the processed image is tracked to yield a measurement and assessment of the cutting quality of the banknotes. Indeed, it is expected that a deteriorating cutting quality (caused e.g. by a defective or worn cutting blade) will translate into a greater amount of "connecting" areas between adjacent lines. Such "connecting" areas will for instance appear due to the presence of improperly cut paper fibers extending at least in part from one banknote to another in the stack, i.e. such fibers would appear as substantially horizontal line segments (in this example) that would effectively "bridge" the gap between adjacent banknote edges.

Figure 3:
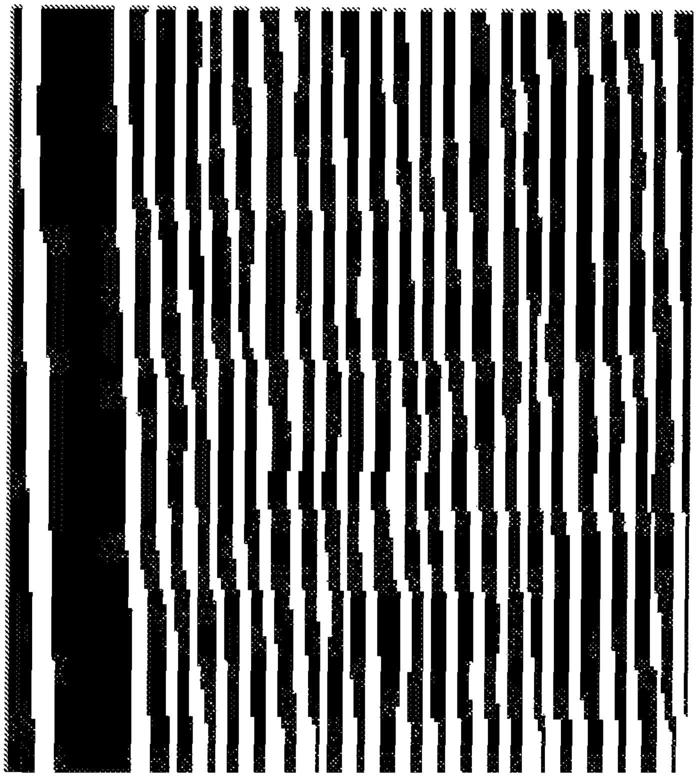
FIG. 3 is a binarized processed image of a portion of the side of a stack of banknotes which is produced as a result of processing of a sample image according to the invention.

This processing leads to the formation in the processed image of a completely coherent set of distinct and continuous lines representing the banknote edges, which lines are completely separated from one another and do not exhibit any "connecting" areas. FIG. 3 is a binarized, black-and-white image of the banknote edges resulting from the above processing (only a portion of the relevant area of interest is shown in FIG. 3) where one can see the set of distinct and continuous lines representing the banknote edges.

In effect, the above processing leads to a modelization of the banknote edges in the relevant area of interest.

As this can be appreciated from looking at the illustration of FIG. 3, each "vertical" line in the binarized image represents a corresponding banknote edge that can be readily identified and accounted for by looking at the transitions from black to white and white to black in the binarized image along the horizontal axis in FIG. 3.

Using the above methodology, it is therefore possible to efficiently count the number of banknotes in any given stack and check if the resulting count corresponds to the expected and desired number of banknotes within the stack. This can for instance be applied to check that each banknote bundle properly comprises hundred banknotes (as is typical), and no more or less.

Tests carried out by the Applicant have demonstrated that the methodology is stable and leads to reliable counting and quality measures, and can suitably be implemented in a real-time environment, especially in the context of the production and/or processing of banknotes.

A practical implementation of the above methodology in a counting system would require a suitable optical sensor for taking the sample image (such as an e.g. color-CMOS camera) and at least one processing unit programmed for performing the above-described processing of the image, such as suitably-programmed standard dual-core computer system.

Processing times of only 200 to 300 ms (depending on the image size) have been achieved in order to count the number of banknotes within a bundle of hundred banknotes, which is a factor 3 to 5 quicker than using conventional rotating counting discs.

Various modifications and/or improvements may be made to the above-described embodiments without departing from the scope of the invention as defined by the annexed claims.

For instance, as already mentioned, processing can be carried out in any desired color space, i.e. on the basis of greyscale or color images.

In addition, the above methodology can be applied for more than one portion of the side of a given stack of documents, for instance with a view to increase the counting reliability.

Lastly, while the invention has been described in relation to the processing of banknote bundles, the invention is applicable to any other field where one desires to discriminate the number of substrates within a stack of substantially planar substrates (such as for counting printed sheets, cards, etc.) and where at least one portion of the side of the stack of substrates is accessible for the acquisition of a sample image thereof.

As indicated hereinabove, the invention can in particular be applied and implemented as a counting system for a banknote processing system or machine. It is in particular contemplated to apply this invention in the context described in EP 2 282 286 A1 and WO 2011/015982 A1, or alternatively WO 2006/016234 A1.

The invention claimed is:

1. A method of touchless counting of substantially planar substrates which are stacked in the form of stacks of substrates, the method comprising the following steps:

taking at least one sample image of a portion of a side of a stack of substrates, which sample image contains contrast information representing substrate edges that extend along substantially a first direction in the sample image;

processing the contrast information representing the substrate edges within the sample image, which processing includes subjecting at least one area of interest within the sample image to anisotropic diffusion to produce a processed image containing a substantially coherent set of continuous lines representing the substrate edges; and counting the number of substrate edges in the processed image.

2. The method according to claim 1, wherein the anisotropic diffusion is based on the Perona-Malik equation.

3. The method according to claim 1, wherein the anisotropic diffusion is based on a wavelet transform.

4. The method according to claim 3, wherein the wavelet transform is an adaptive wavelet transform.

5. The method according to claim 1, wherein the anisotropic diffusion is adapted to filter and preserve the substrate edges along the first direction without destroying contrast between the substrate edges.

6. The method according to claim 1, wherein the processing of the contrast information representing the substrate edges further includes processing the substantially coherent set of continuous lines representing the substrate edges to remove connecting areas between adjacent lines and separating the lines into a completely coherent set of distinct and continuous lines representing the substrate edges.

7. The method according to claim 6, further comprising the step of measuring the number of connecting areas between the lines and assessing cutting quality based on the measured number of connecting areas.

8. The method according to claim 1, wherein the processed image is binarized before counting the number of substrate edges contained therein.

9. The method according to claim 1, wherein the substrates are banknotes.

10. The method according to claim 9, wherein the stacks of substrates are banknote bundles comprising a determined number of banknotes.

11. The method according to claim 10, wherein the banknote bundles comprise hundred banknotes.

12. The method according to claim 1, implemented in a real-time environment.

13. The method according to claim 12, implemented in the context of the production and/or processing of banknotes.

14. A counting system for touchless counting of substantially planar substrates which are stacked in the form of stacks of substrates, wherein the counting system comprises:

an optical sensor for taking at least one sample image of a portion of a side of a stack of substrates, which sample image contains contrast information representing substrate edges that extend along substantially a first direction in the sample image; and at least one processing unit programmed to perform processing of the contrast information representing the substrate edges within the sample image, which processing includes subjecting at least one area of interest within the sample image to anisotropic diffusion to produce a processed image containing a substantially coherent set of continuous lines representing the substrate edges, the processing unit being further programmed to count the number of substrate edges in the processed image.

15. A banknote processing system or machine, comprising a counting system as defined in claim 14.

16. The banknote processing system or machine as defined in claim 15, wherein the stack of substrates consists of a bundle strip and wherein the sample image is taken along a longitudinal side of the bundle strip while the bundle strip is being displaced along a direction of displacement which is parallel to the longitudinal side of the bundle strip.

* * * * *